(12) United States Patent
Al-Ghamdi et al.

(10) Patent No.: US 9,979,052 B2
(45) Date of Patent: May 22, 2018

(54) GRAPHENE OXIDE BASED ELECTROCHEMICAL CELL AND BATTERY

(71) Applicant: KING ABDULAZIZ UNIVERSITY, Jeddah (SA)

(72) Inventors: Ahmed A. Al-Ghamdi, Jeddah (SA); Yusuf Al-Turki, Jeddah (SA); Fahrettin Yakuphanoglu, Elazig (TR); Farid El-Tantawy, Ismailia (EG)

(73) Assignee: King Abdulaziz University, Jeddah (SA)

( * ) Notice: Subject to any disclaimer, the term of this patent is extended or adjusted under 35 U.S.C. 154(b) by 442 days.

(21) Appl. No.: 14/752,309

(22) Filed: Jun. 26, 2015

(65) Prior Publication Data

US 2016/0380306 A1 Dec. 29, 2016

(51) Int. Cl.
| | |
|---|---|
| *H01M 10/0563* | (2010.01) |
| *H01M 10/36* | (2010.01) |
| *H01M 4/38* | (2006.01) |
| *H01M 4/583* | (2010.01) |
| *H01M 6/04* | (2006.01) |
| *H01M 4/46* | (2006.01) |

(52) U.S. Cl.
CPC .............. *H01M 10/36* (2013.01); *H01M 4/38* (2013.01); *H01M 4/583* (2013.01); *H01M 6/045* (2013.01); *H01M 4/463* (2013.01); *H01M 2220/20* (2013.01); *H01M 2300/0002* (2013.01)

(58) Field of Classification Search
CPC ...... H01M 10/36; H01M 4/583; H01M 6/045; H01M 4/38; H01M 4/463; H01M 2220/20; H01M 2300/0002
See application file for complete search history.

(56) References Cited

U.S. PATENT DOCUMENTS

| | | | | |
|---|---|---|---|---|
| 827,297 | A | | 7/1906 | Edison |
| 2,301,390 | A | * | 11/1942 | Forsythe ................ H01M 6/04 429/202 |
| 3,035,945 | A | * | 5/1962 | Lawson ................ H01M 6/04 429/118 |

(Continued)

FOREIGN PATENT DOCUMENTS

| | | |
|---|---|---|
| CN | 102249220 | 11/2011 |
| CN | 103311502 | 9/2013 |

(Continued)

OTHER PUBLICATIONS

Dinesh et al. "Water Soluble Graphene as Electrolyte Additive in Magnesium-Air Battery System." Journal of Power Sources 276 (2015) 32-38, available Nov. 2014.*

(Continued)

*Primary Examiner* — Michael L Dignan
(74) *Attorney, Agent, or Firm* — Oblon, McClelland, Maier & Neustadt, L.L.P.

(57) ABSTRACT

A graphene oxide based electrochemical cell and a battery containing a plurality of electrochemical cells, at least one of which is the graphene oxide based electrochemical cell. The graphene oxide based electrochemical cell includes an aqueous electrolyte solution, an anode and a cathode contained in a vessel, wherein the aqueous electrolyte solution includes water, graphene oxide nanosheets and $CuCl_2$ dissolved in the water.

15 Claims, 8 Drawing Sheets

(56) References Cited

U.S. PATENT DOCUMENTS

| | | | | |
|---|---|---|---|---|
| 3,205,096 | A | * 9/1965 | Honer | H01M 4/58 429/118 |
| 3,853,623 | A | * 12/1974 | Davis | H01M 4/54 429/144 |
| 6,033,602 | A | * 3/2000 | Sunshine | H01M 4/06 252/511 |
| 6,677,082 | B2 | 1/2004 | Thackeray et al. | |
| 8,877,391 | B2 | 11/2014 | Friesen et al. | |
| 2010/0301279 | A1 | 12/2010 | Nesper et al. | |
| 2012/0321969 | A1 | 12/2012 | Friesen et al. | |
| 2013/0333937 | A1 | 12/2013 | Avouris et al. | |
| 2014/0050910 | A1 | 2/2014 | Mukherjee et al. | |
| 2014/0266055 | A1 | 9/2014 | Trimble et al. | |
| 2014/0266056 | A1 | 9/2014 | Trimble et al. | |

FOREIGN PATENT DOCUMENTS

| | | |
|---|---|---|
| IN | 368/DEL/2012 | 8/2014 |
| KR | 10-2014-0037319 | 3/2014 |
| WO | WO 95/30248 | * 4/1994 |
| WO | 2014/160087 | 10/2014 |

OTHER PUBLICATIONS

Sammoura et al. "Water-activated disposable and long shelf life microbatteries." Sensors and Actuators A 111 (2004) 79-86, presented Jan. 2003, available Feb. 2003 (Year: 2003).*

Suenne Kim et al., "Room Temperature Metastability of Multilayer Graphene Oxide Films," Nature Materials, Nature Publishing Group, 2011, vol. 11, 19 pages, <hal-00911814>.

Guoping Xiong et al., "Graphitic Petal Micro-Supercapacitor Electrodes for Ultra-High Power Density," Energy Technology, 2014, vol. 2, pp. 897-905, doi: 10.1002/ente.201402055.

Sanjaya D. Perera et al., "Alkaline Deoxygenated Graphene Oxide for Supercapacitor Applications: An Effective Green Alternative for Chemically Reduced Graphene," Journal of Power Sources, Oct. 1, 2012, vol. 215, Abstract (2 pages).

Keagan Pokpas et al., "Electrochemically Reduced Graphene Oxide Pencil-Graphite in situ Plated Bismuth-Film Electrode for the Determination of Trace Metals by Anodic Stripping Voltammetry," International Journal of Electrochemical Science, 2014, vol. 9, pp. 736-759.

E. Badiei et al., "Graphene Oxide Antibacterial Sheets: Synthesis and Characterization," International Journal of Engineering (IJE), Transactions C: Aspects, 2014, vol. 27, No. 12, pp. 1803-1808.

* cited by examiner

GRAPHENE OXIDE BASED ELECTROCHEMICAL CELL AND BATTERY

BACKGROUND OF THE INVENTION

Technical Field

The present disclosure relates to a graphene oxide based electrochemical cell, and a battery comprising a plurality of electrochemical cells, at least one of which is the graphene oxide based electrochemical cell. More specifically, the graphene oxide based electrochemical cell comprises an aqueous electrolyte solution, an anode and a cathode contained in a vessel, wherein the aqueous electrolyte solution comprises water, graphene oxide nanosheets and a transition metal salt such as $CuCl_2$ dissolved in the water.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

Current means of transportation, e.g. automobiles, airplanes, and ships, rely mostly on fossil fuels, which increase the carbon oxide concentration in the atmosphere. Additionally, the supply of fossil fuels is finite, and the costs of exploring fossil fuels are increasing. Thus, alternative sources of energy for transportation are needed.

Over the past decade, electrical energy from lithium ion batteries has been used to power electrical vehicles and hybrid electrical vehicles. Lithium ion batteries have also been used as primary energy storage systems for portable electronics, such as laptops and mobile phones. However, owing to their low power densities, lithium ion batteries have achieved a limited success, particularly in commercial applications in electrical vehicles and hybrid electrical vehicles. As a result, lithium ion batteries used in automotive applications today are often coupled with an additional source of energy, such as conventional combustion engines or capacitors. Incorporation of additional energy storage systems not only complicates the design of the electrical vehicles, but naturally adds to the cost of the vehicles, making it less viable economically.

Graphene oxide is a compound of carbon, oxygen, and hydrogen in variable ratios, obtained by treating graphite with strong oxidizers. The oxidized bulk product is a yellow solid with a C/O ratio between 2.1 and 2.9. The structure and properties of graphene oxide depend on the particular synthesis method and degree of oxidation, however, the graphene oxide structure typically preserves the layer structure of the parent graphite, comprising stacked layers of graphene oxide nanosheets. Additionally, graphene oxide is hydrophilic and can be dispersed in water or an aqueous solution to form a colloid.

BRIEF SUMMARY OF THE INVENTION

According to a first aspect, the present disclosure relates to a graphene oxide based electrochemical cell of high energy density, comprising an aqueous electrolyte solution, an anode and a cathode contained in a vessel. The aqueous electrolyte solution of the electrochemical cell comprises water, graphene oxide nanosheets and a transition metal salt such as $CuCl_2$ dissolved in the water.

In one or more embodiments, the anode of the graphene oxide based electrochemical cell is aluminum and the cathode is graphite.

In one or more embodiments, the distance between the anode and the cathode of the graphene oxide based electrochemical cell ranges from about 1 cm to about 5 cm.

In one or more embodiments, the concentration of the graphene oxide nanosheets in the aqueous electrolyte solution of the graphene oxide based electrochemical cell ranges from about 0.5 mg/ml to about 5 mg/ml.

In one or more embodiments, the concentration of $CuCl_2$ in the aqueous electrolyte solution of the graphene oxide based electrochemical cell ranges from about 0.5 M to about 5 M.

In one or more embodiments, the graphene oxide nanosheets used in the aqueous electrolyte solution of the graphene oxide based electrochemical cell have a thickness ranging from 4 nm to 8 nm and form stacked layers.

In one or more embodiments, the open circuit voltage of the graphene oxide based electrochemical cell is at least 0.59 V.

In one or more embodiments, the short circuit current of the graphene oxide based electrochemical cell is at least 95.10 mA.

In one or more embodiments, the maximum power of the graphene oxide based electrochemical cell is at least about 13 mW.

In one or more embodiments, the graphene oxide based electrochemical cell further comprises at least one other metal salt selected from the group consisting of silver nitrate and gold chloride.

According to a second aspect, the present disclosure relates to a battery comprising a plurality of electrochemical cells, and at least one of the electrochemical cells comprises an aqueous electrolyte solution, an anode and a cathode contained in a vessel. Further, the aqueous electrolyte solution of the at least one of the electrochemical cells comprises water, graphene oxide nanosheets and a transition metal salt such as $CuCl_2$ dissolved in the water.

In one or more embodiments, the plurality of the electrochemical cells in the battery is connected electrically in series and/or in parallel.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
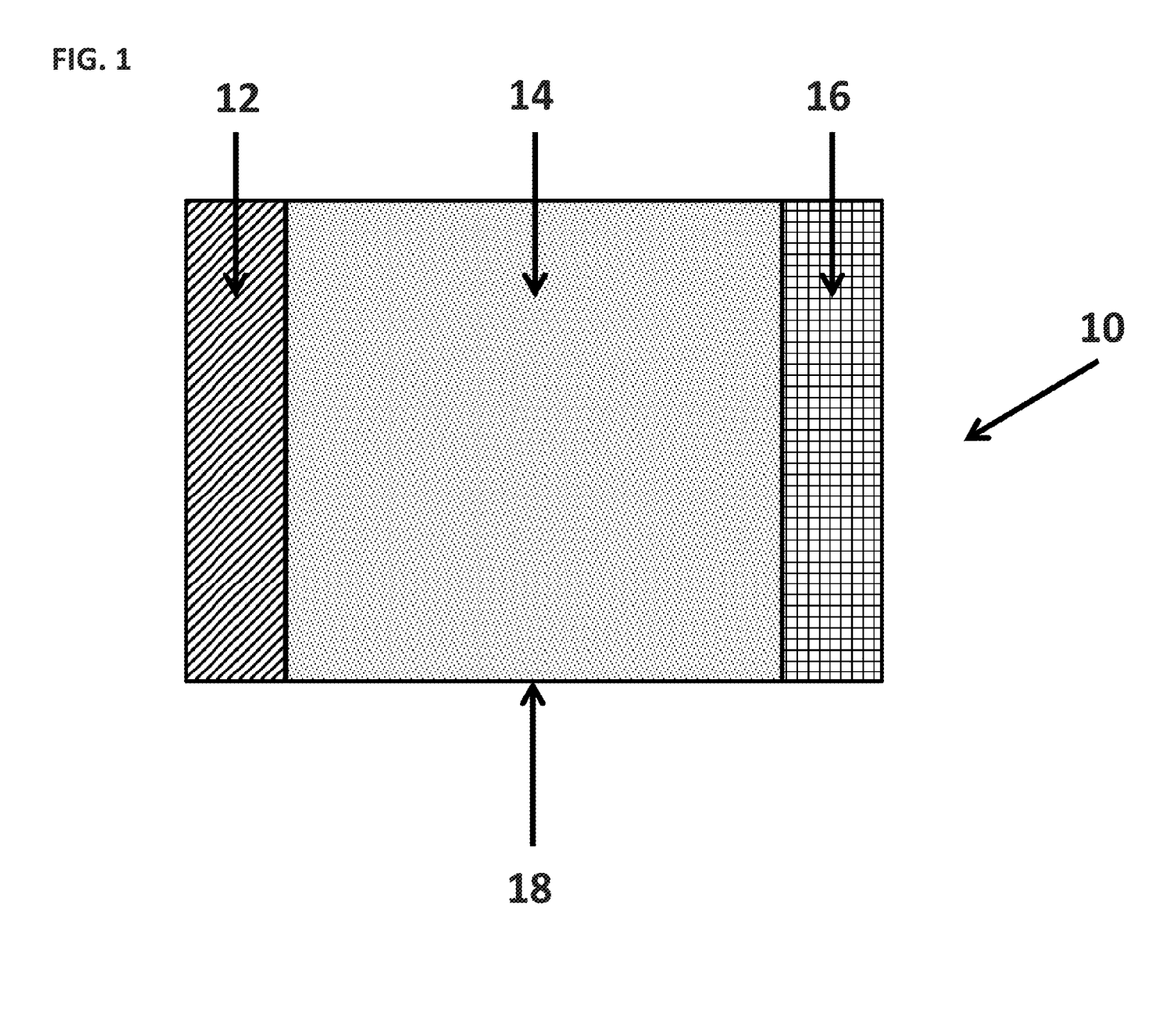
FIG. 1 is a schematic representation of the graphene oxide based electrochemical cell.

In the present disclosure, a graphene oxide based electrochemical cell and a battery comprising a plurality of electrochemical cells, at least one of which is such a graphene oxide based electrochemical cell, are provided. FIG. 1 schematically shows the graphene oxide based electrochemical cell 10 having an anode 12 separated from a cathode 16 by an aqueous electrolyte solution 14, all contained in an insulating vessel 18 with suitable terminals (not shown) being provided in electric contact with the anode 12 and the cathode 16. The aqueous electrolyte solution 14 comprises water, graphene oxide nanosheets and a transition metal salt such as $CuCl_2$ dissolved in the water.

The anode of the graphene oxide based electrochemical cell can be made of a metal or an alloy. In one embodiment, the anode of the electrochemical cell is aluminum. In another embodiment, the anode can be iron. In another embodiment, the anode can be copper. In another embodiment, the anode may be zinc. In another embodiment, the anode can be magnesium. In still another embodiment, the anode may be an alloy comprising at least two metals selected from the group consisting of aluminum, iron, copper, zinc, and magnesium.

Since the graphene oxide based electrochemical cell uses a metal as the anode, the metal is consumed as a "fuel" during discharge, i.e. the metal fuel is oxidized, with the oxidized metal fuel ions remaining in the electrolyte solution in reducible form (either as solvated ions, or combined with other ions, such as in a molecule or complex). A significant problem for an electrochemical cell comprising a metal fuel is the tendency for corrosion or self-discharge during idle modes (e.g. storage). This most often translates to a loss in usable capacity. In more extreme cases, self-discharge may result in outgassing and excess pressures may rupture cell seals, ultimately causing cell failure.

A number of additives may be added, either individually or in combination, to the aqueous electrolyte solution of the graphene oxide based electrochemical cell to inhibit corrosion of the metal anode and/or extend the cell capacity. Non-limiting examples of the additives include the hetero-ionic aromatic additives, metal salts of differing metals than the metal fuel comprising metal salts of indium, tin, lead, germanium, copper, mercury or other suitable metal or semi-metal, and metal oxides of differing metals than the metal fuel comprising metal oxides of indium, tin, lead, germanium, copper, mercury or other suitable metal or semi-metal as disclosed in PCT Application Publication WO2014160087 A2; hetero-ionic compounds such as hetero-ionic compound cations selected from the group of 1-methyl-4-aza-1-azoniabicyclo[2,2,2]octane, methyl-3-quinuclidinolium, their derivatives and combinations thereof, as disclosed in U.S. patent application Ser. No. 13/526,432 (published as US Patent Application Publication US20120321969 A1); macroheterocyclic compounds, quaternary phosphonium salts, aminophosphonium salts, derivatives and combinations thereof, as disclosed in PCT Application Publication WO2014160087 A2 and US Patent Application Publication US20140266056 A1; and poly(ethylene glycol) tetrahydrofurfuryl (PEG-THF) and/or salts of indium, tin, lead, germanium, copper, mercury, bismuth, tartrate, phosphate, citrate, succinate, ammonium or other hydrogen evolution reaction (HER) suppressing additives as disclosed in U.S. patent application Ser. No. 13/028,496 (issued as U.S. Pat. No. 8,877,391 B2).

In one embodiment, the cathode is graphite. In another embodiment, the cathode is a graphene modified graphite electrode with a layer of graphene on the surface of an otherwise "bare" graphite electrode. The layer of graphene can be formed by electrochemically reducing graphene oxide on the surface of the "bare" graphite electrode known in the art.

In one embodiment, the distance between the anode and the cathode ranges from about 1 cm to about 5 cm, more preferably from about 2 cm to about 4 cm, more preferably about 3 cm, and most preferably about 2 cm. The length of both electrodes can be between 2 cm and 10 cm, more preferably between 4 cm and 8 cm, more preferably between 4 cm and 6 cm, and most preferably about 4 cm. Other dimensions for the distance between, and the length of, the electrodes are also preferable, depending on specific applications and the capacity of the graphene oxide based electrochemical cell or the battery comprising the cell(s) needed.

In one embodiment, the graphene oxide of the electrochemical cell has the chemical formula $C_8O_4H_{17}$ (based on the elemental analysis). After subtraction of hydrogen as water, $C_8O_{3.2}$ is obtained with a C/O ratio of 2.5. Using X-ray diffraction analysis, it can be shown that dry graphene oxide has the inter-planar distance of 6.1 Å, nearly double the inter-planar distance of 3.35 Å in graphite. In the present disclosure, graphene oxide has a C/O ratio of less than 4, preferably less than 3.5, more preferably less than 3, more preferably less than 2.5, most preferably between 0.5 and 2.1. The C/O ratio is preferably at least 0.5, more preferably at least 1.0, more preferably at least 1.5. By contrast, graphene and graphite are carbonaceous materials with a C/O ratio of 4 or higher, such as about 7, at least 13.5, at least 20, and at least 25.

In one embodiment, the concentration of graphene oxide in the aqueous electrolyte solution of the electrochemical cell may be between about 0.5 mg/ml and about 5 mg/ml, preferably between about 1 mg/ml and about 4 mg/ml, more preferably between about 2 mg/ml and about 3 mg/ml, and most preferably about 1 mg/ml.

Graphene oxide forms stacked layers of nano-structures, or nanosheets. In some embodiments, graphene oxide nanosheets have wrinkled and/or rippled morphologies, with the height of the wrinkles or ripples from the basal plane of the graphene oxide nanosheets ranging from less than 0.2 nm to about 3 nm. In other embodiments, the height may range from about 0.5 nm to about 2.5 nm. In still other embodiments, the height may range from about 1 nm to about 2 nm. In still other embodiments, the height may range from about 0.5 nm to about 1.5 nm. The number of wrinkles or ripples of a graphene oxide nanosheet can vary, for example, from 1 to about 10, depending on the chemical structure, the size of the nanosheet, and other factors. Additionally, the stacked layers of graphene oxide nanosheets may be corrugated. Wrinkled, rippled, or corrugated graphene oxide nanosheets have substantially greater surface areas than non-wrinkled, non-rippled, or non-corrugated nanosheets of comparable size, contributing to high electrical conductivity of graphene oxide.

Depending on the methods of synthesizing graphene oxide, which include, but are not limited to, arc-discharge (described below), the Hummers Method, and the Brodie Method, graphene oxide nanosheets of varying thickness may be obtained. In one embodiment, the graphene oxide nanosheets used in the electrochemical cell have an average thickness of from 4 nm to 8 nm, preferably from 5 nm to 7 nm, and more preferably about 6 nm. The width of graphene oxide nanosheets can be several micrometers. In one embodiment, the graphene oxide nanosheets have a width of about 7 µm. In some embodiments, the width of graphene oxide nanosheets may range from about 1 µm to about 20 µm. In other embodiments, the width may range from about 3 µm to about 18 µm. In other embodiments, the width may range from about 5 µm to about 15 µm. In other embodiments, the width may range from about 7 µm to about 12 µm. In still other embodiments, the width may range from about 8 µm to about 10 µm.

Depending on the graphene oxide synthesis methods and post-synthesis treatments, graphene oxide nanosheets of varying sizes can be obtained. For example, ultrasonic treatment commonly used to accelerate graphene oxide dispersion in water or an aqueous solution to form a colloid reduces the size of graphene oxide nanosheets. In some embodiments, the graphene oxide nanosheets can have an area ranging from about 10 $nm^2$ to about 1000 $nm^2$. In other embodiments, the area of the graphene oxide nanosheets may range from 20 to 900 $nm^2$. In other embodiments, the area of the graphene oxide nanosheets may range from 40 to 800 $nm^2$. In other embodiments, the area of the graphene oxide nanosheets may range from 60 to 700 $nm^2$. In still other embodiments, the area of the graphene oxide nanosheets may range from 80 to 600 $nm^2$. In still other embodiments, the area of the graphene oxide nanosheets may range from 100 to 500 $nm^2$. In still other embodiments, the area of the graphene oxide nanosheets may range from 150 to 400 $nm^2$. In still other embodiments, the area of the graphene oxide nanosheets may range from 200 to 300 $nm^2$.

The graphene oxide based electrochemical cell is metastable, since multilayer graphene oxide is a metastable material whose structure and chemistry evolve at room temperature, e.g. at 20° C., with a characteristic relaxation time of about one month. At the quasi-equilibrium, graphene oxide reaches a nearly stable reduced O/C ratio, and exhibits a structure deprived of epoxide groups and enriched in hydroxyl groups. The structural and chemical changes of graphene oxide nanosheets are driven by the availability of hydrogen in the oxidized graphitic sheets, which favors the reduction of epoxide groups and the formation of water molecules.

In one embodiment, the concentration of the transition metal salt ranges from about 0.5 M to about 5 M, preferably from about 0.5 M to about 4 M, more preferably from about 1 M to 3 M, and most preferably at about 1 M. Non-limiting examples of the transition metals that may be used to form a salt in the aqueous electrolyte solution of the graphene oxide based electrochemical cell include Cu, Sc, Y, Ti, Zr, V, Nb, Cr, Mo, W, Mn, Tc, Fe, Ru, Co, Rh, Ni, Pd, Ag, Au, Zn, Cd, Hg, and the like.

In one embodiment, the open circuit voltage of the graphene oxide based electrochemical cell is at least 0.59 V. In another embodiment, the open circuit voltage is at least 0.7 V. In another embodiment, the open circuit voltage is at least 0.8 V. In still another embodiment, the open circuit voltage is at least 1 V. In still another embodiment, the open circuit voltage is at least 1.2 V.

In one embodiment, the short circuit current of the graphene oxide based electrochemical cell is at least 95.10 mA. In another embodiment, the short circuit current is at least 110 mA. In another embodiment, the short circuit current is at least 130 mA. In another embodiment, the short circuit current is at least 150 mA. In another embodiment, the short circuit current is at least 180 mA. In still another embodiment, the short circuit current is at least 200 mA.

In one embodiment, the maximum power of the graphene oxide based electrochemical cell is at least about 13 mW. In another embodiment, the maximum power of the cell is at least 15 mW. In still another embodiment, the maximum power of the cell is at least 18 mW. In still another embodiment, the maximum power of the cell is at least 20 mW. In still another embodiment, the maximum power of the cell is at least 25 mW.

In some embodiments, the energy density of the graphene oxide based electrochemical cell may be at least 400 Wh/L at 20° C. In other embodiments, the energy density of the graphene oxide based electrochemical cell may be at least 550 Wh/L at 20° C. In still other embodiments, the energy density of the graphene oxide based electrochemical cell can be at least 750 Wh/L at 20° C. (greater than that of a conventional lithium ion electrochemical cell or battery).

Changing the compositions of the electrodes and electrolytes as described in the present disclosure may change the open circuit voltage, the short circuit current, and the maximum power. For example, selecting a metal or an alloy other than aluminum as the anode may alter the open circuit voltage. The short circuit current may be changed by changing the concentrations of the electrolytes, e.g. graphene oxide and/or $CuCl_2$.

Further, modifying the compositions of the electrolytes may also change the voltage and/or current, resulting in a change in the maximum power of the graphene oxide based electrochemical cell. For example, adding one or more transition metal salts selected from the group consisting of silver nitrate and gold chloride to the aqueous electrolyte solution comprising graphene oxide and $CuCl_2$ can increase the current and/or voltage of the graphene oxide based electrochemical cell. In that case, a silver nitrate solution and/or a gold chloride ($AuCl_3$) solution can be mixed with a graphene oxide colloid, optionally followed by sonication. This mixture can then be mixed with $CuCl_2$ powder or a concentrated $CuCl_2$ stock solution to obtain the final modified electrolyte solution. In some embodiments, the concentration of silver nitrate or gold chloride in the modified electrolyte solution ranges from 0.01 nM to 1 nM, preferably from 0.05 nM to 0.8 nM, more preferably from 0.1 nM to 0.6 nM, more preferably from 0.2 nM to 0.4 nM, and most preferably at about 0.3 nM.

Figure 2:
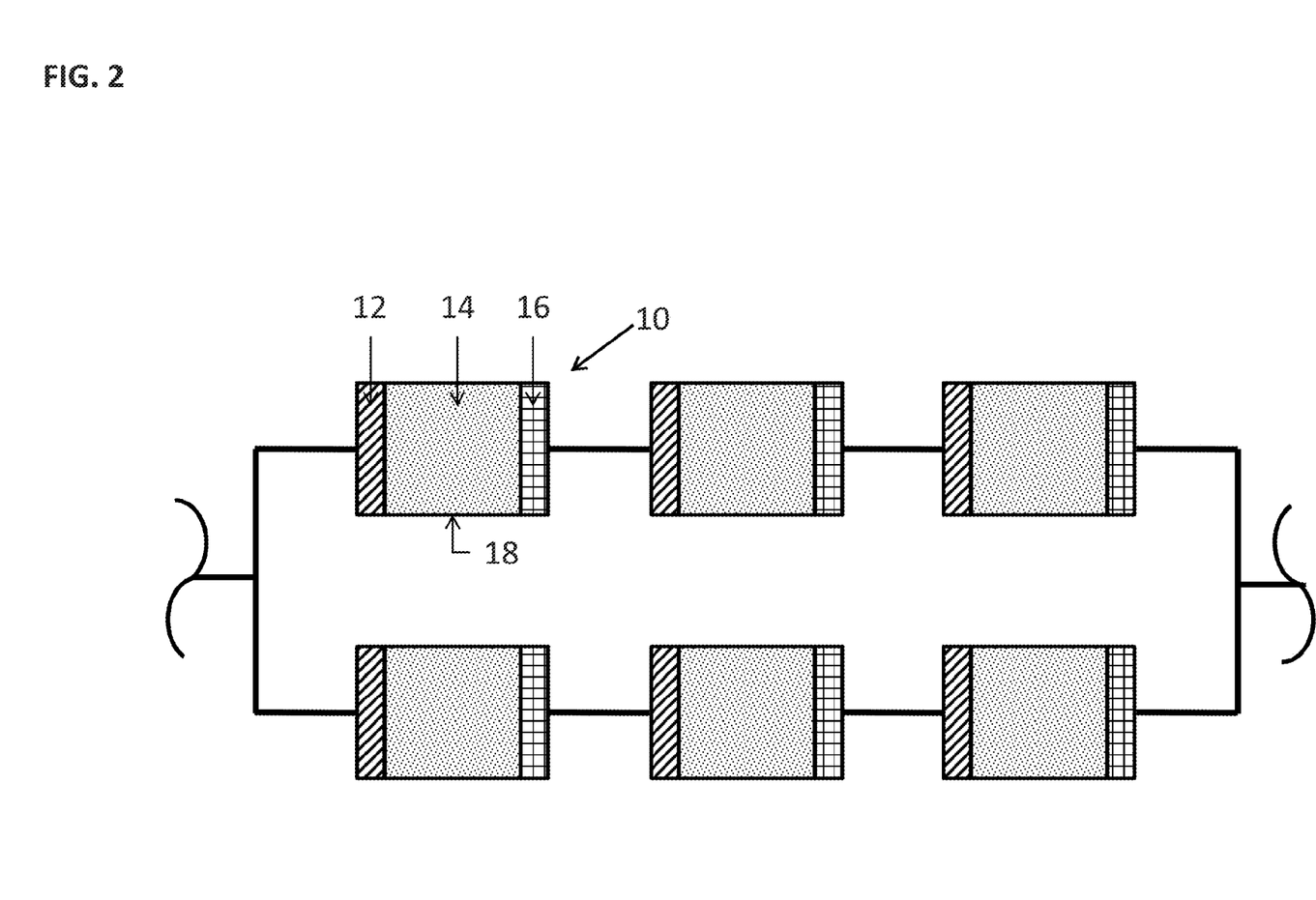
FIG. 2 is a schematic representation of a battery consisting of a plurality of the graphene oxide based electrochemical cells connected electrically in series and in parallel.

The graphene oxide based battery can be fabricated by connecting several single electrochemical cells, at least one of which is the graphene oxide based electrochemical cell, to one another in parallel and/or in series. FIG. 2 shows one embodiment of the battery in which two strings of the graphene oxide based electrochemical cells are arranged in parallel, with each string comprising three cells arranged in series.

EXAMPLE 1

Synthesis of Graphene Oxide

Graphene oxide was synthesized by a modified Hummer's method as follows:

2.0 g of graphite was dissolved in 250 ml of $H_2SO_4$ in an ice bath with constant stirring for 2 hours, followed by the addition of 6.0 g of $KMnO_4$ and 1.0 g of $NaNO_3$ with continued stirring in a water bath for 20 minutes. Then, 250 ml of de-ionized water was slowly added, and the temperature of the solution was raised to 98° C. and maintained for 30 minutes. The reaction was stopped by adding 300 ml of de-ionized water and 40 ml of 35% $H_2O_2$. The color of the solution changed to brilliant yellow. The graphene oxide powder obtained was washed, filtered, and dried at 50° C. for 2 days.

Figure 3:
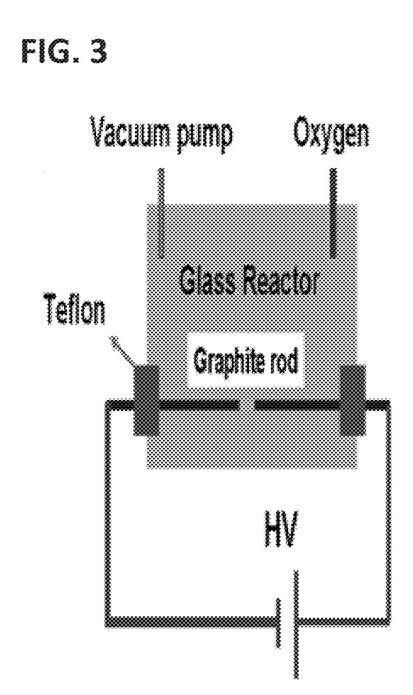
FIG. 3 is a schematic diagram illustrating the arc-discharge technique and apparatus used to prepare graphene oxide nanosheets from graphite according to Example 1.

Alternatively, graphene oxide was synthesized by arc-discharge as follows:

As shown in FIG. 3, graphene oxide was synthesized from graphite by arc-discharge in a glass arc reactor comprising an anode, which was a graphite rod of 5 mm in diameter and 200 mm in length, and a cathode, which was a pure graphite rod of 5 mm in diameter and 200 mm in length. The cathode was horizontally fixed by a stationary Teflon holder (indicated by an arrow). The arc reactor was first evacuated by a vacuum pump. Then, with the anode tip gradually being moved towards the cathode, an arc-discharge process was maintained between the tips of the anode and the cathode with a high voltage (HV) of approximately 50 KV and a DC current of about 25 A. Since the anode was consumed during the arc-discharge process, the anode had to be advanced manually towards the cathode to keep the arc gap between the electrodes at about 1 mm. Also during the arc-discharge process, oxygen gas was supplied to the arc reactor with a pressure of 260 Torr and a flow rate of 5-10 L/min. The duration of the arc-discharge process was about 2 seconds. After the arc-discharge process, cotton-like graphene oxide powder attached to the wall of the arc reactor was collected.

EXAMPLE 2

X-Ray Diffraction Analysis of the Synthesized Graphene Oxide

Figure 4:
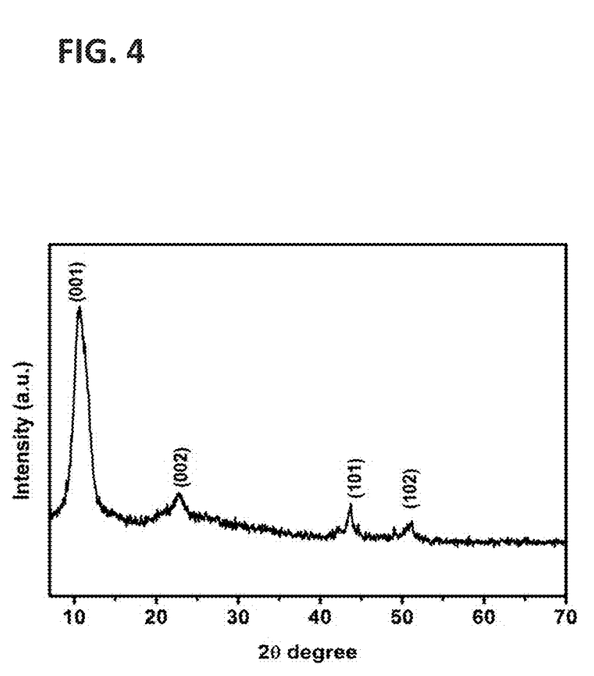
FIG. 4 is an X-ray diffraction diagram of graphene oxide synthesized by a modified Hummer's method according to Example 2.
Figure 5:
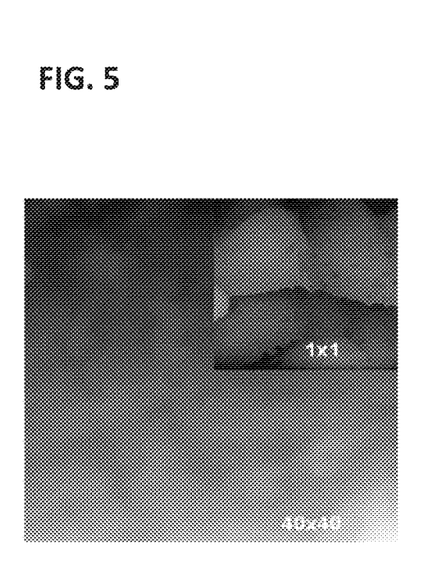
FIG. 5 is an atomic force microscope (AFM) image of the graphene oxide nanosheets synthesized by the modified Hummer's method according to Example 2.

The graphene oxide synthesized by the modified Hummer's method in Example 1 was subjected to X-ray diffraction analysis. The resulting X-ray diffraction diagram in FIG. 4 showed a broad peak near $2\theta=10.63°$ corresponding to the interlayer spacing of 8.32 Å of graphene oxide, indicating that graphene oxide had been exfoliated successfully. Further, the synthesized graphene oxide was subjected to atomic force microscopy (AFM). The AFM image in FIG. 5 showed that the synthesized graphene oxide comprised stacked graphene oxide nanosheets about 4 nm thick and about 7 μm wide.

Figure 6:
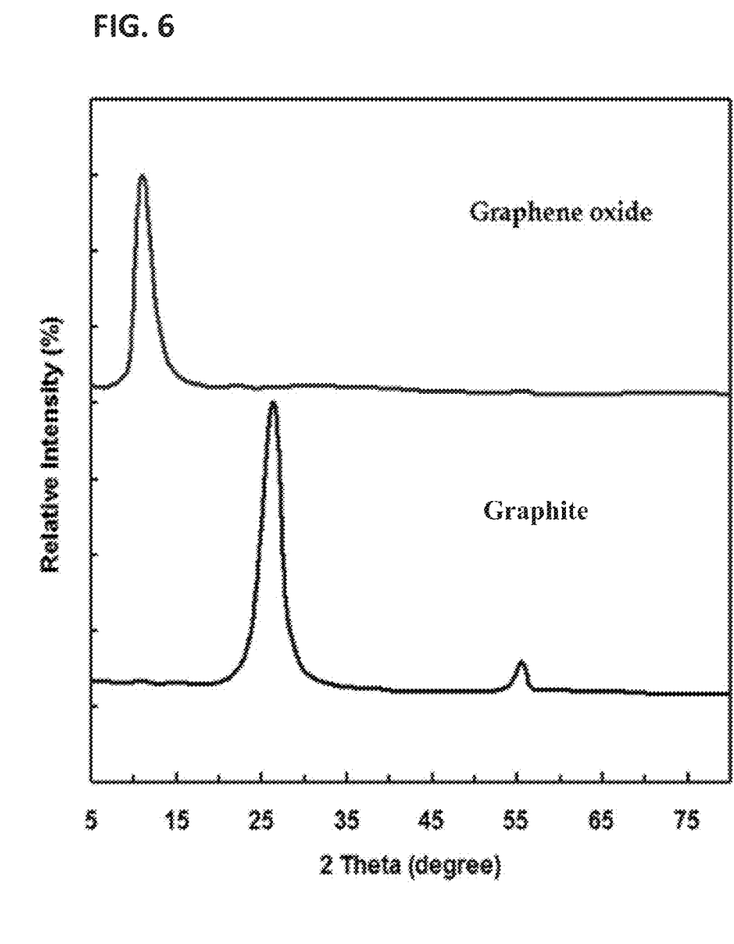
FIG. 6 is an X-ray diffraction diagram showing the X-ray spectra of pristine graphite and graphene oxide synthesized by arc-discharge according to Example 2.
Figure 7:
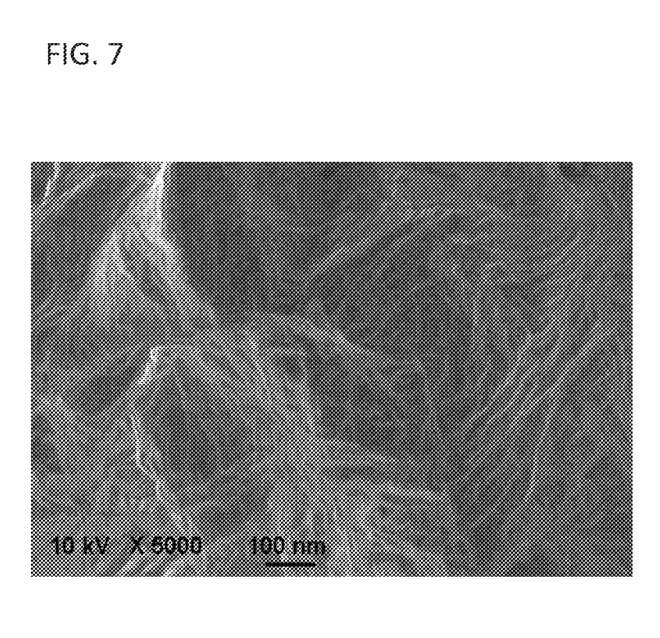
FIG. 7 is a field emission scanning electron microscope (FESEM) image of graphene oxide nanosheets synthesized by arc-discharge according to Example 2.
Figure 8:
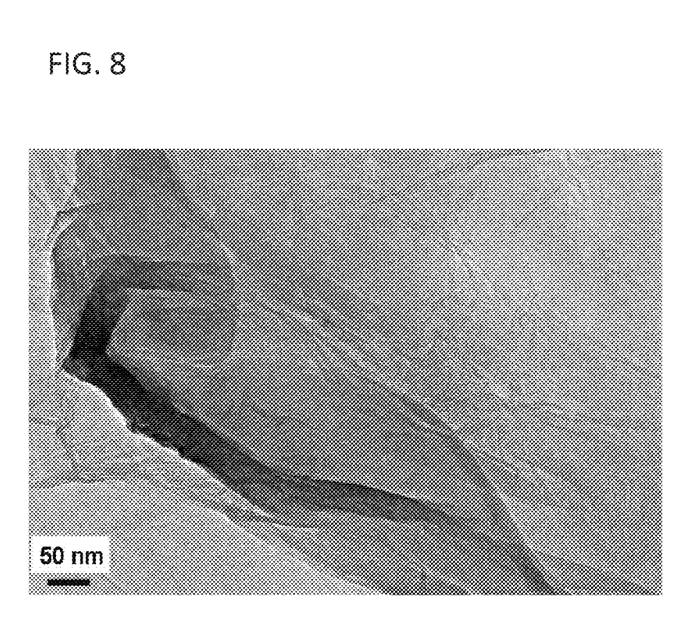
FIG. 8 is a transmission electron microscope (TEM) image of graphene oxide nanosheets synthesized by arc-discharge according to Example 2.

Likewise, the graphene oxide synthesized by arc-discharge in Example 1 was subjected to X-ray diffraction analysis. The X-ray diffraction diagram in FIG. 6 displayed a strong and sharp peak located at $2\theta=11.2°$ (002), which is a typical diffraction peak of graphene oxide attributed to a conserved graphene-like honeycomb lattice in graphene oxide. Additionally, the observed interlayer spacing ($d_{002}$) of the synthesized graphene oxide was about 0.75 nm, matching that of a typical graphene oxide. By contrast, a pristine graphite sample, which has an interlayer distance ($d_{002}$) of 0.335 nm, gave rise to two reflection peaks at $2\theta=26.6°$ (002) and $2\theta=54.8°$ (004). Further, the synthesized graphene oxide was subjected to field emission scanning electron microscopy (FESEM) and transmission electron microscopy (TEM), with their respective images shown in FIG. 7 and FIG. 8. The graphene oxide synthesized by arc-discharge comprised graphene oxide nanosheets about 6 nm thick with wrinkled and/or rippled morphologies representing a number of stacked layers of graphene oxide nanosheets. Some multilayered graphene oxide nanosheets were scrolled or corrugated.

EXAMPLE 3

Figure 9:
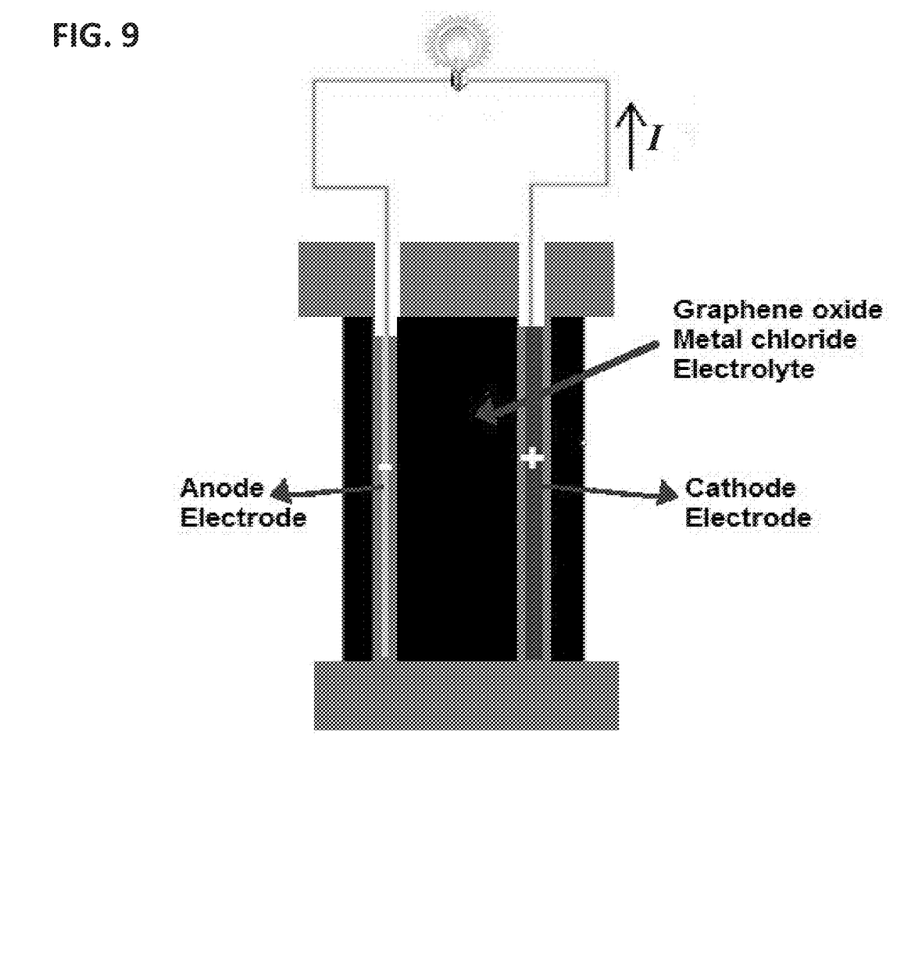
FIG. 9 is a schematic diagram of the graphene oxide based electrochemical cell fabricated according to Example 3.

Fabrication and Characterization of the Graphene Oxide Based Electrochemical Cell FIG. 9 shows an embodiment of the graphene oxide based electrochemical cell with an aluminum rod as the anode and a graphite rod as the cathode. Housed in a cylindrical glass vessel, the cell had a length of 5.0 cm and a diameter of 3.0 cm. Both electrodes were 4 cm long and 5.0 mm in diameter, and were separated by a distance of 2 cm. The electrolyte solution was prepared by suspending 100 mg of graphene oxide in 100 ml of 1 M $CuCl_2$ water solution. Once the electrolyte solution was added to the cell vessel, the graphite and aluminum electrodes were immersed in the solution.

Figure 10:
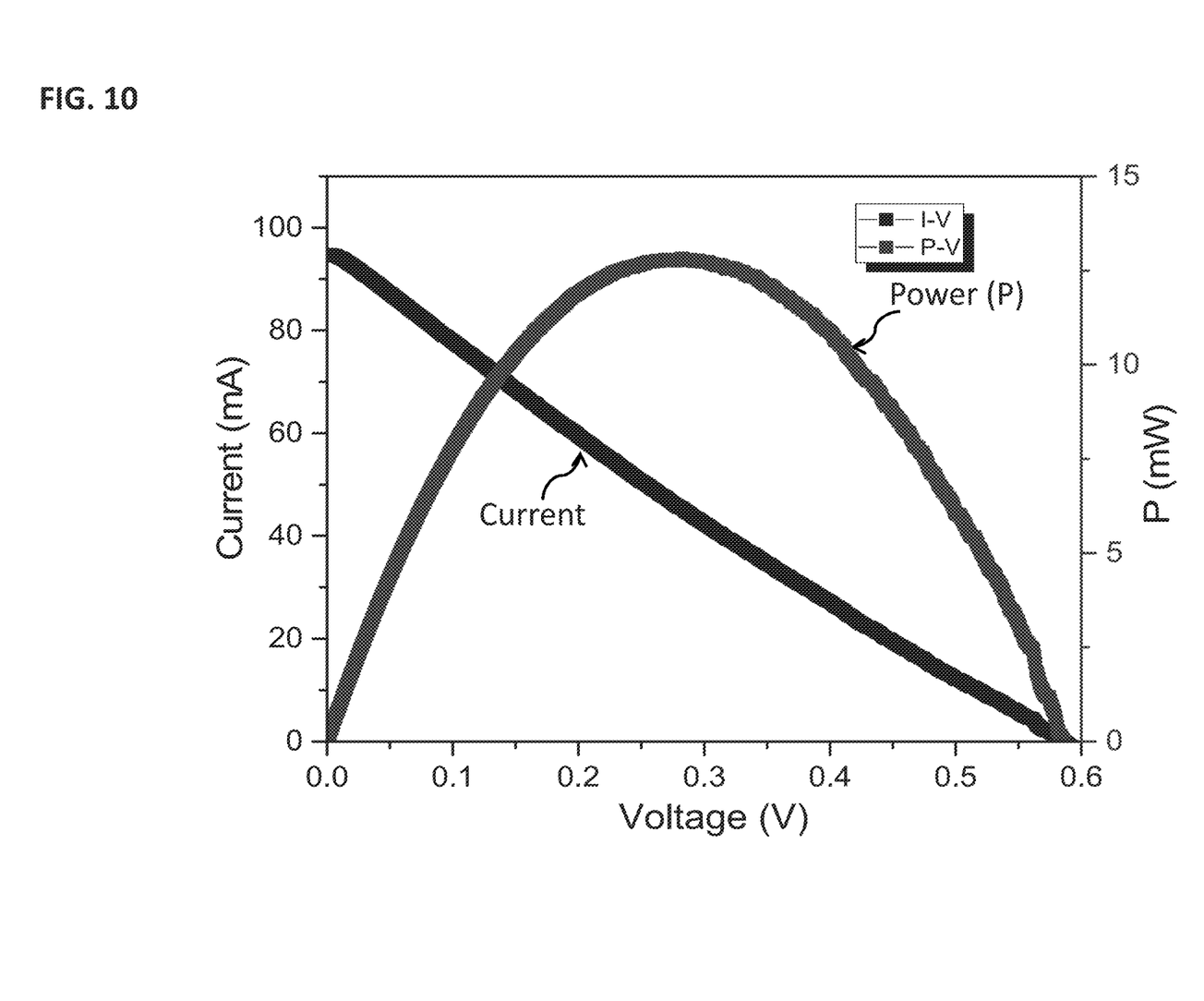
FIG. 10 is a graphical presentation of the current-voltage relationship and the power-voltage relationship of the graphene oxide based electrochemical cell according to Example 3.
Figure 11:
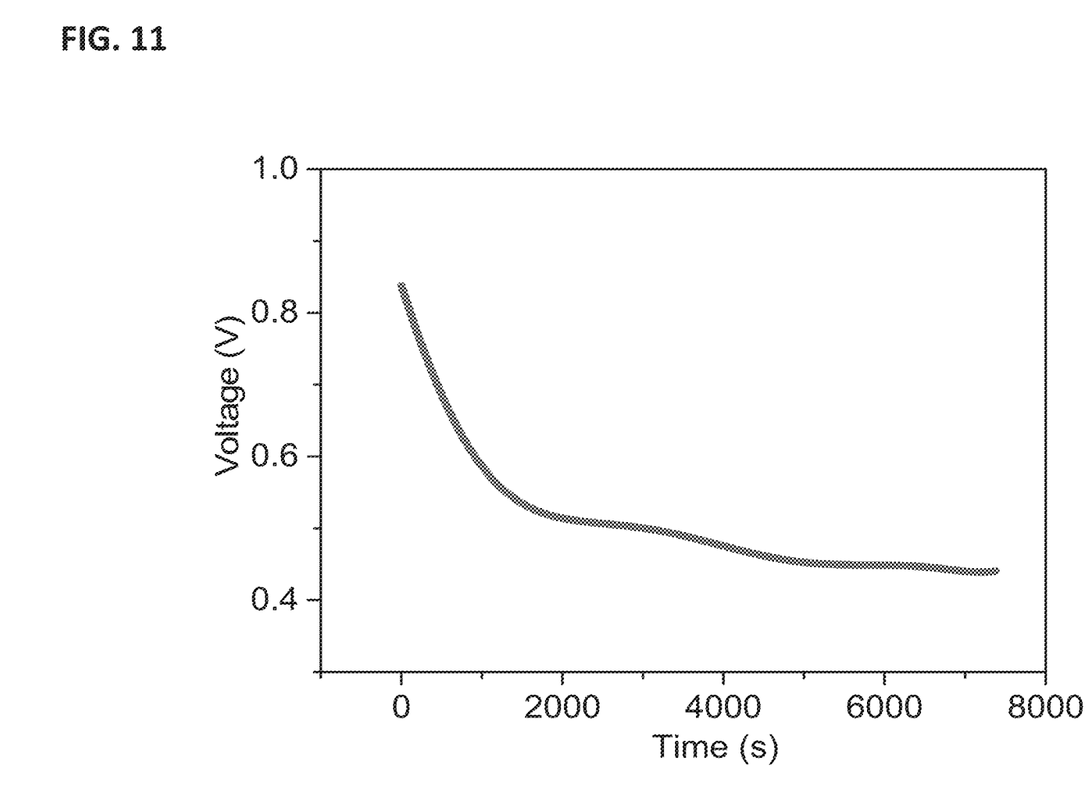
FIG. 11 is a graphical presentation of the voltage-time relationship of the graphene oxide based electrochemical cell according to Example 3.

As shown in FIG. 10, the graphene oxide based electrochemical cell fabricated above had an open circuit voltage of 0.59 V, a short circuit current of 95.10 mA, and a maximum power of 13.1 mW. Additionally, as shown in FIG. 11, the voltage of the graphene oxide based electrochemical cell remained mostly stable for an extended period of time, i.e. up to 2 hours in this Example, following an initial drop approximately during the first 2000 seconds, or 33 minutes, of discharge. Further, the output current of the cell could be controlled by changing the concentrations of graphene oxide, $CuCl_2$, and/or additional compositions, e.g. metal salts such as silver nitrate and gold chloride, in the electrolyte solution.

The invention claimed is:

1. A graphene oxide based electrochemical cell, comprising: an aqueous electrolyte solution, an aluminum anode and a graphene-coated graphite cathode contained in a vessel,
    wherein the aqueous electrolyte solution consists of water, graphene oxide nanosheets and $CuCl_2$, and optionally at least one selected from the group consisting of silver nitrate and gold chloride, dissolved in the water,
    wherein the graphene oxide nanosheets are present in the aqueous electrolyte solution in an amount of from 0.5 mg/ml to 5 mg/ml and the $CuCl_2$ is present in the aqueous electrolyte solution in concentration of from 0.5 M to 5M.

2. The graphene oxide based electrochemical cell of claim 1, wherein the distance between the anode and the cathode ranges from about 1 cm to about 5 cm.

3. The graphene oxide based electrochemical cell of claim 1, wherein the open circuit voltage of said graphene oxide based electrochemical cell is at least 0.59 V.

4. The graphene oxide based electrochemical cell of claim 1, wherein the short circuit current of said graphene oxide based electrochemical cell is at least 95.10 mA.

5. The graphene oxide based electrochemical cell of claim 1, wherein the maximum power of said graphene oxide based electrochemical cell is at least about 13 mW.

6. The graphene oxide based electrochemical cell of claim 1, wherein the aqueous electrolyte solution consists of water, the graphene oxide nanosheets, the $CuCl_2$ and at least one selected from the group consisting of silver nitrate and gold chloride.

7. The graphene oxide based electrochemical cell of claim 1, wherein the graphene oxide nanosheets consist of C and O.

8. The graphene oxide based electrochemical cell of claim 1, wherein the vessel is glass and the cathode and anode are at opposite sides thereof, and the anode and the cathode are separated by a distance that is less than the lengths of the anode and the cathode.

9. The graphene oxide based electrochemical cell of claim 1, wherein the graphene oxide nanosheets are present in the aqueous electrolyte solution in an amount of from 0.5 mg/ml to 1 mg/ml and the $CuCl_2$ is present in the aqueous electrolyte solution in concentration of from 0.5 M to 1M.

10. A battery, comprising:
a plurality of electrochemical cells,
wherein at least one electrochemical cell comprises an aqueous electrolyte solution, an aluminum anode and a graphene-coated graphite cathode contained in a vessel,
wherein the aqueous electrolyte solution consists of water, graphene oxide nanosheets and $CuCl_2$, and optionally at least one selected from the group consisting of silver nitrate and gold chloride, dissolved in the water,
wherein the graphene oxide nanosheets are present in the aqueous electrolyte solution in an amount of from 0.5 mg/ml to 5 mg/ml and the $CuCl_2$ is present in the aqueous electrolyte solution in concentration of from 0.5 M to 5M.

11. The battery of claim 10, wherein the plurality of electrochemical cells is connected electrically in series and/or in parallel.

12. The battery of claim 10, wherein the aqueous electrolyte solution consists of water, the graphene oxide nanosheets, the $CuCl_2$ and at least one selected from the group consisting of silver nitrate and gold chloride.

13. The battery of claim 10, wherein the graphene oxide nanosheets consist of C and O.

14. The battery of claim 10, wherein the vessel is glass and the cathode and anode are at opposite sides thereof, and the anode and the cathode are separated by a distance that is less than the lengths of the anode and the cathode.

15. The battery of claim 10, wherein the graphene oxide nanosheets are present in the aqueous electrolyte solution in an amount of from 0.5 mg/ml to 1 mg/ml and the $CuCl_2$ is present in the aqueous electrolyte solution in concentration of from 0.5 M to 1M.

* * * * *